(12) United States Patent
Halls et al.

(10) Patent No.: US 9,680,873 B1
(45) Date of Patent: Jun. 13, 2017

(54) TRUSTED NETWORK DETECTION

(71) Applicant: Bromium, Inc., Cupertino, CA (US)

(72) Inventors: David Halls, Cambridge (GB); Gaurav Banga, Cupertino, CA (US); Ian Pratt, Cambridge (GB); Vikram Kapoor, Cupertino, CA (US); Xin Li, Cupertino, CA (US)

(73) Assignee: Bromium, Inc., Cupertino, CA (US)

( * ) Notice: Subject to any disclaimer, the term of this patent is extended or adjusted under 35 U.S.C. 154(b) by 147 days.

(21) Appl. No.: 14/320,084

(22) Filed: Jun. 30, 2014

(51) Int. Cl.
*H04L 29/06* (2006.01)

(52) U.S. Cl.
CPC .............. *H04L 63/20* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 6,948,044 B1 | 9/2005 | Chandrasekaran | |
| 7,171,523 B2 | 1/2007 | Yamasaki | |
| 7,506,265 B1 | 3/2009 | Traut et al. | |
| 8,146,084 B1 | 3/2012 | Meketa | |
| 8,346,727 B1 | 1/2013 | Chester et al. | |
| 8,370,933 B1 * | 2/2013 | Buckler | H04L 63/14 709/223 |
| 8,543,641 B2 | 9/2013 | Cherukuri et al. | |
| 8,887,245 B1 * | 11/2014 | Wiltzius | H04L 63/1433 726/25 |
| 2004/0128670 A1 | 7/2004 | Robinson et al. | |
| 2005/0149726 A1 | 7/2005 | Joshi et al. | |
| 2006/0101189 A1 | 5/2006 | Chandrasekaran et al. | |
| 2006/0136910 A1 | 6/2006 | Brickell et al. | |
| 2006/0143617 A1 | 6/2006 | Knauerhase et al. | |
| 2006/0184937 A1 | 8/2006 | Abels et al. | |
| 2006/0288343 A1 | 12/2006 | Pallister | |
| 2007/0064661 A1 * | 3/2007 | Sood | H04L 29/12481 370/338 |
| 2007/0180450 A1 | 8/2007 | Croft et al. | |
| 2007/0192329 A1 | 8/2007 | Croft et al. | |
| 2007/0250833 A1 | 10/2007 | Araujo et al. | |

(Continued)

FOREIGN PATENT DOCUMENTS

WO    2008073618 A2    6/2008

*Primary Examiner* — Farid Homayounmehr
*Assistant Examiner* — Henry Tsang
(74) *Attorney, Agent, or Firm* — Brokaw Patent Law PC; Christopher J. Brokaw

(57) ABSTRACT

Approaches for processing network requests based upon the perceived trustworthiness of the network. A software component renders a judgment, based on a policy that weighs one or more factors, about whether a network accessible to a device should be trusted. If the software component renders a judgment that the network should be trusted, then a network resource identified on a white list of trusted resources is allowed to be retrieved within a host operating system or in a first virtual machine. Conversely, if the software component renders a judgment that the network should not be trusted, then the network resource identified on the white list of trusted resources is prevented from be retrieved within the host operating system or the first virtual machine, and may instead be retrieved within a second virtual machine, which has a more restrictive set of access privileges than the first virtual machine.

12 Claims, 6 Drawing Sheets

(56) References Cited

U.S. PATENT DOCUMENTS

| | | | |
|---|---|---|---|
| 2008/0001958 A1 | 1/2008 | Vembu et al. | |
| 2008/0127319 A1* | 5/2008 | Galloway | G06F 21/31 726/9 |
| 2008/0168545 A1* | 7/2008 | Inoue | H04L 63/0815 726/6 |
| 2009/0007242 A1 | 1/2009 | Subramanian et al. | |
| 2009/0119541 A1 | 5/2009 | Inoue et al. | |
| 2009/0125902 A1* | 5/2009 | Ghosh | G06F 9/45533 718/1 |
| 2009/0165133 A1 | 6/2009 | Hwang et al. | |
| 2009/0172820 A1 | 7/2009 | Watson | |
| 2009/0249472 A1 | 10/2009 | Litvin et al. | |
| 2009/0276783 A1 | 11/2009 | Johnson et al. | |
| 2009/0313620 A1 | 12/2009 | Sedukhin et al. | |
| 2009/0328033 A1 | 12/2009 | Kohavi et al. | |
| 2010/0122343 A1 | 5/2010 | Ghosh et al. | |
| 2010/0235831 A1 | 9/2010 | Dittmer | |
| 2011/0035494 A1 | 2/2011 | Pandey et al. | |
| 2011/0041187 A1* | 2/2011 | Ikeda | G06F 21/78 726/26 |
| 2011/0173251 A1 | 7/2011 | Sandhu et al. | |
| 2011/0296487 A1 | 12/2011 | Walsh | |
| 2011/0302577 A1 | 12/2011 | Reuther et al. | |
| 2012/0089666 A1 | 4/2012 | Goswami et al. | |
| 2013/0007848 A1* | 1/2013 | Chaskar | H04W 12/12 726/4 |
| 2013/0318594 A1* | 11/2013 | Hoy | H04L 63/0272 726/15 |

\* cited by examiner

TRUSTED NETWORK DETECTION

RELATED APPLICATION DATA

This application is related to U.S. patent application Ser. No. 13/115,354, filed on May 25, 2011, entitled "Approaches for Securing an Internet Endpoint Using Fine-Grained Operating System Virtualization," invented by Gaurav Banga et al., the disclosure of which is hereby incorporated by reference in its entirety for all purposes as if fully set forth herein.

This application is related to U.S. patent application Ser. No. 13/419,345, filed on Mar. 13, 2012, entitled "Seamless Management of Untrusted Data Using Virtual Machines," invented by Gaurav Banga et al., the disclosure of which is hereby incorporated by reference in its entirety for all purposes as if fully set forth herein.

This application is related to U.S. patent application Ser. No. 13/667,750, filed on Nov. 2, 2012, entitled "Instantiation of a Virtual Machine Using a Reduced Size Template", invented by Jacob Gorm Hansen et al., the disclosure of which is hereby incorporated by reference in its entirety for all purposes as if fully set forth herein.

FIELD OF THE INVENTION

Embodiments of the invention relate to processing network requests based, at least in part, upon the perceived trustworthiness of the network.

BACKGROUND

Many locations, such as coffee shops, libraries, and businesses, offer the public access to wireless networks. Such access may be complimentary or available for a fee. Public computer networks are common targets for infection by malicious code. Any computer which joins an infected public network may itself become targeted and infected by malicious code residing on the network.

Presently, there are a variety of techniques for scanning digital files transferred to a computer to determine whether any portion of the digital file matches a signature associated with a known virus or malicious code. Once identified, such dangerous files are quarantined and appropriate security measures taken. Unfortunately, due to an increase in exploitation of file format vulnerabilities, attacks that exploit relatively unknown vulnerabilities are becoming more common.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
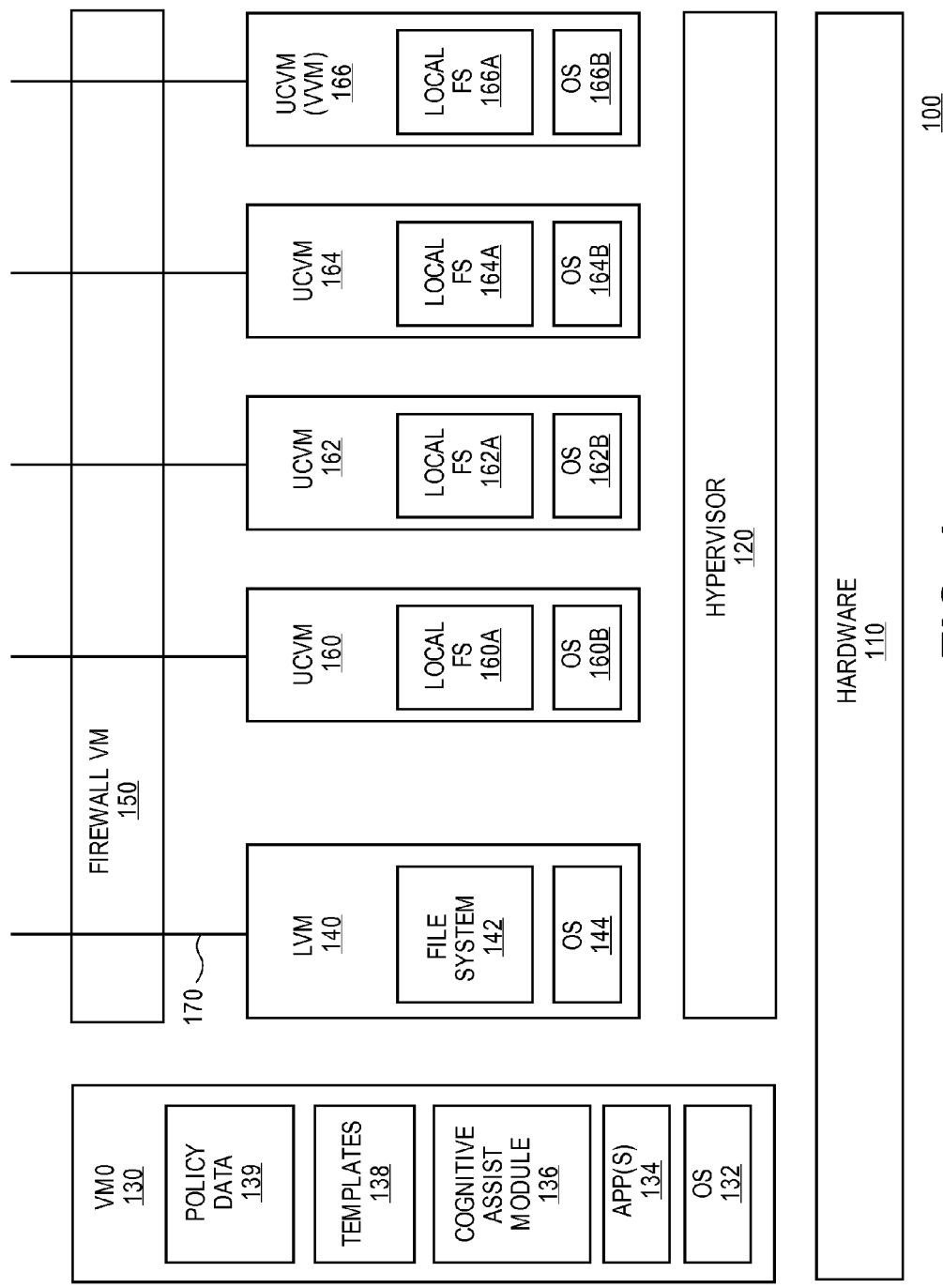
FIG. 1 is an block diagram of the functional components of one embodiment of the invention.

Approaches for me processing network requests based, at least in part, upon the perceived trustworthiness of the network are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Computerized devices are often instructed by the users to join networks which the users themselves know little about. For example, when sipping a cup of coffee at a coffee shop, one might instruct their tablet PC to join the coffee shop's free Wi-Fi. As another example, when on vacation, one might authorize their cell phone to pay a small fee to join the hotel's wireless network. In each of these examples, while the user cannot verify the security of the network, the user judges that the usefulness of joining the network outweighs the risk of exposure of malicious code on the network. Embodiments of the invention help manage the risk posed to computerized devices by potential exposure to malicious code when joining computer networks.

In an embodiment of the invention, a software component, executing on a device, renders a judgment, based on a policy that weighs one or more factors, about whether a network accessible to the device should be trusted. This policy may weigh a variety of different factors or considerations to render this judgment. The reason for this consideration is that if the network, or a DNS located on the network, is malicious, then the network may redirect a request for a network resource to a malicious attack site. For example, if the network resource being requested is a web page, then a DNS which has been infected with malicious code might redirect the web page request to an IP address associated with a web page containing malware or other malicious code. If the web page containing the malware or malicious code is retrieved within the host operating system of a device, then the host operating system of the device may become infected with the malicious code. Since the host operating system acts as a root of trust for the device, the device may become corrupted and at the mercy of the malicious code.

Advantageously, embodiments of the invention address and overcome this concern. If the software component running on the device concludes that the network should be trusted, then the software component may allow network resources identified on a white list of trusted resources to be retrieved within a host operating system on the device. On the other hand, if the software component concludes that the network should not be trusted, then the software component may prevent any network resources identified on the white list of trusted resources to be retrieved within the host operating system. Instead, the network resource may be retrieved within a virtual machine instantiated for that purpose. In this case, if the DNS does redirect a request for a network resource to a different resource containing malicious code, then the malicious code will be isolated within the virtual machine and will be prevented from infecting the host operating system.

Additional details about the policy used by embodiments in determining whether a network or DNS should be trusted shall be discussed below in the section entitled "Policy Considerations for Determining Whether a Network Should be Trusted." However, before doing so, it will be helpful to have an understanding of illustrative operating environments employed by embodiments of the invention.

Illustrative Operating Environments

A block diagram of client 100 according to one embodiment of the invention is shown in FIG. 1. The term "client," as broadly used herein, represents any type of Internet endpoint, computer system, and/or device capable of connecting to a network and executing a virtual machine. Non-limiting, illustrative examples of client 100 include a PC, a laptop computer, a tablet computer, a cell phone, a personal digital assistant (PDA), and the like.

In an embodiment, client 100 may be embodied as a physical device which is acts as a server. Thus, while use of the term "client" in other contexts might exclude an interpretation that includes a server, as broadly used herein, client 100 may be embodied on a wide variety of machines, one example of such being a server. Thus, as the Applicant may be his or her own lexicographer, as used herein, the term client 100 expressly includes a device acting as a server. For example, non-limiting, illustrative examples of client 100 include a web server, an application server, a file server, and a cloud server. Indeed, implementing embodiments of the invention upon a server may yield many benefits. The micro-virtualization techniques employed by embodiments provide an efficient mechanism for eliminating the risk of executing untrusted code and/or interpreting untrusted data in accordance with different policies to manage such risk. As such, a device, such as a server, which interacts with (a) numerous sources of untrusted code and/or data and/or (b) two or more corporate entities having different policies towards managing the risk of untrusted code and/or data, may benefit from embodiments of the invention.

In an embodiment, client 100 includes a number of virtual machine that execute on hardware 110 of client 100. A description of a client that executes a virtual machine may be found in one or more of U.S. patent application Ser. No. 13/115,354, U.S. patent application Ser. No. 13/419,345, and U.S. patent application Ser. No. 13/667,750, the disclosures of which are hereby incorporated by reference for all purposes as if fully set forth herein.

The various VMs executing on client 100 may be used for separately executing processes associated with different activities. One such VM, namely "VM0" (i.e., VM0 130 of FIG. 1), is secured so that VM0 may serve as the root of trust with a guaranteed integrity. VM0 may contain core operating system 132 and one or more applications 134. In the embodiment shown in FIG. 1, VM0 is not accessible over any network, such as the Internet. As shall be explained below, VM0 provides a secure environment in which operating system 132 and one or more applications 134 may execute without risk of exposure to malicious code.

Other VMs, such as VMs 160, 162, 164, and 166 in FIG. 1, may be created, maintained, and destroyed on-demand using a very efficient micro-virtualizing hypervisor 120. Using efficient micro-virtualization techniques, the latency of starting and stopping activities or applications which run in their own VM in embodiments is very low, thereby providing a practical user experience while employing full OS virtualization.

In an embodiment of the invention, a special virtual machine, referred to herein as "VM0," is created to be a trusted and secure portion of a computer system. FIG. 1 depicts VM0 130 according to an embodiment. VM0 130 may be (but need not be) permanently disconnected from any network (i.e., VM0 130 is not connected to any local network or the Internet). Specifically, VM0 130 may not contain any type of networking stack, such as a TCP/IP network stack, and may not have access to any networking hardware that could allow for communication between VM0 130 or any applications 134 executed thereby and the Internet. Thus, in an embodiment, the only way to install software onto VM0 130 is to have physical custody of client 100 and manually install the software on VM0 130.

Note that in certain embodiments, VM0 130 may be implemented to execute on native hardware. In such an embodiment, VM0 130 would not be considered a virtual machine. Thus, while examples are discussed herein where VM0 130 is implemented as a virtual machine, other embodiments of the invention may embody VM0 130 not as a virtual machine, but instead, may execute VM0 130 on native hardware.

Thus, in certain embodiments, one or more applications 134 executing within VM0 130 do not have any access to a network, must be fully self-contained in their functionality, and must rely only on local code and data for all their functionality. All applications that need to access the network will therefore need to run in a separate virtual machine outside of VM0 130, as shall be described in further detail below. It is envisioned that the software (such as one or more applications 134) running in VM0 130 be selected at the time client 100 is manufactured or first configured for use in a controlled environment. If VM0 130 is never connected to any type of network, such as a TCP/IP network, all common types of network initiated attacks cannot be waged against VM0 130, thereby rendering VM0 130 immune to such attacks and safe as compared to any computer or VM that is connected to the Internet.

In an embodiment where hypervisor 120 is a Type 2 hypervisor, when client 100 is booted, only VM0 130 is started by the BIOS or firmware of client 100. Once VM0 130 is running, VM0 130 can start hypervisor 120 immediately or on demand. In another embodiment, where hypervisor 120 is a type 1 hypervisor, hypervisor 120 is first started by the BIOS when client 100 is booted and VM0 130 is launched by the Hypervisor 120. Hypervisor 120 is a software component that is responsible for creating other VMs which each execute independent instances of the operating system. These additional VMs are instantiated by VM0 130 and/or hypervisor 120 to run any untrusted code or code that needs to access the network. Untrusted code in this context is any code which has not been pre-approved as being trusted by an IT administrator of client 100. Note that the user's desktop may, but need not, run in VM0 130. If the user's desktop is not run within VM0 130, then it could be run within another VM, such as one specifically tailored to that task. The additional VMs are started "silently" and automatically by client 100, e.g., these VMs are started transparently to the user and without the user having to do anything explicit. These additional VMs are also not explicitly visible to the user; instead, all the user sees on the desktop is familiar objects (such as icons, windows, and applications) without any indication that multiple VMs are executing in client 100. Embodiments of the invention follow rules that govern what application activities are assigned to which particular VM. Additional examples of such rules are described below in greater detail.

In another embodiment (not depicted in FIG. 1), VM0 130 may have a networking stack that is firewalled off from the network using well-tested firewall software, thereby allowing VM0 130 to have access to a computer network. Such an embodiment may only allow connections with a specific Internet system so that the software inside VM0 130 may be updated from a designated update server. For example, the firewall software may only allow VM0 130 to connect to one or more servers associated with the IT administrator of client 100 and may prevent VM0 130 from establishing a connection with any other endpoint on any network.

Interaction with a User Interface

All code responsible for generating a user interface (UI) not associated with an application may be maintained in VM0 130. Consequently, all UI interaction activity with the desktop between a user and software executing on client 100 may take place between the user and VM0 130, which maintains a unified desktop for all applications running in all VMs. Interaction between the user and applications running in VMs other than VM0 130 takes place indirectly via VM0 130. For example, when the user enters a password for a web site whose browser and HTML/JavaScript code is running in an untrusted VM, the password is first directly provided to VM0 130, which then transfers the information to an untrusted VM responsible for interacting with the web site. Furthermore, the untrusted VM's display is rendered on to a virtualized display, which is then composed into the VM0 130 desktop (as appropriate) by controlling code running in VM0 130. As code executing in VM0 130 is trusted, the user may trust any user interface controls displayed on a screen since all code responsible for rendering the user interface is trusted.

This approach is quite different from prior systems where often the code that controls the full desktop experience is untrusted. Consequently, if the code responsible for generating the user interface is corrupted by malware, then the user interface may be used as a tool to deceive the user. For example, malware may cause a user interface control to be displayed that requests the user to submit an authentication credential which will be used for improper purposes by the malware. However, this problem is overcome by embodiments of the invention—since all code responsible for rendering user interface controls executes in VM0 in an embodiment, malware is prevented from hijacking or corrupting UI-rendering code.

Figure 2:
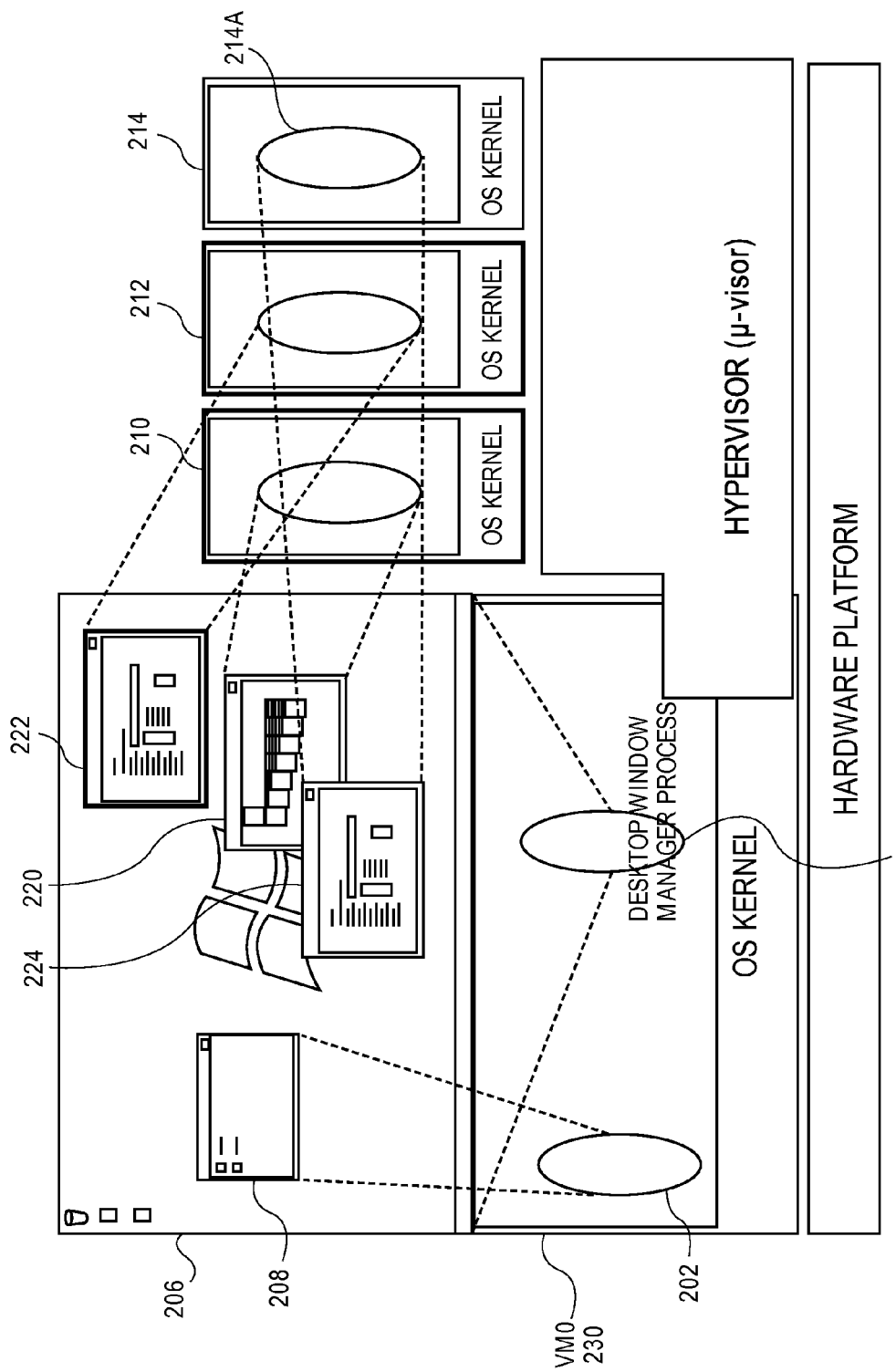
FIG. 2 is an illustration of exemplary desktop of a client according to an embodiment of the invention.

To illustrate an embodiment of the invention, consider FIG. 2, which is an illustration of exemplary desktop of client 100 according to an embodiment. As shown in FIG. 2, process 204 is responsible for rendering desktop 206 on a physical display of client 100. Process 214A runs in untrusted VM 214 and does not have complete access to the file system of client 100. When process 214A running inside VM 214 requests access to the file system of client 100, the request is intercepted and handled by VM0 230. For example, process 202 may be responsible for rendering a window 208 depicting the contents of the file system of client 100. Process 202 has the option of selectively determining which contents are available to VM 214 based on policies as set forth by the IT administrator or the user. Process 214A may generate the contents of a display window 224 to be shown on desktop 206 based on the information made available to it by processes 202.

VM 210 in FIG. 2 that runs the solitaire game shown in display window 220 is implemented such that the display of VM 210 is a virtualized display, which is then composed into the desktop 206 (as appropriate) by controlling process 204 running in VM0 130. Display windows 222 and 224, which depict content generated by processes running in VMs 212 and 214 respectively, are rendered on the desktop 206 in a similar fashion.

The Legacy Virtual Machine—LVM

FIG. 1 depicts a legacy virtual machine (LVM) 140 according to an embodiment of the invention. LVM 140 serves as the primary entity being managed by the IT administrator of client 100. As such, LVM 140 provides an environment that is analogous to the managed enterprise OS of corporate computer system in that an IT department may install and maintain various enterprise applications within operating system 144 of LVM 140. Certain embodiments may not comprise a LVM 140, and as a result, the presence of LVM 140 is optional within embodiments of the invention.

LVM 140 may contain operating system 144. In an embodiment, operating system 144 of LVM 140 may correspond to a Microsoft Windows OS or any other general purpose OS such as Linux or MacOS.

In an embodiment, LVM 140 is responsible for storing the main file system 142 of client 100. File system 142 may contain the user's profile folder containing the user's settings and files.

LVM 140 typically only runs infrastructure OS programs and programs that are used for the purpose of managing client 100 and trusted enterprise applications. Other user programs (especially those that involve external components or consume untrusted data) do not run in LVM 140, but instead, run elsewhere in separate VMs (such as a UCVM as described in more detail below).

In an embodiment, the network access of LVM 140 is restricted to just the corporate network as implemented by firewall VM 150. Firewall VM 150 is a specialized virtual machine that comprises firewall software/applications to restrict network access of VMs running in client 100 to appropriate and/or necessary network access points. Such practice is consistent with the need for only the responsible IT administrator to be capable of connecting to LVM 140 to manage LVM 140 and processes executing therein.

In one embodiment, LVM 140 and VM0 130 may be implemented in a single virtual machine.

Untrusted Code Virtual Machine—UCVM

In an embodiment, when a user wishes to run any application that requires access to either a network or untrusted data (untrusted data is any data that originates from outside client 100), the application is run inside a dedicated VM that is created on-demand by hypervisor 120. This dedicated VM is called an Untrusted Code Virtual Machine (or "UCVM"). FIG. 1 depicts several UCVMs, namely UCVM 160, 162, 164, and 166. A UCVM operates under the assumption that, in general, any code that connects to the network and interacts with arbitrary code executing on an external device may at some point be compromised. This assumption also applies to trusted applications that interact with data originating from outside the computer system executing the trusted application, because such data may, at some point, contain embedded malicious code. To address such possibilities, such applications are executed in a UCVM to prevent any malicious code, inadvertently introduced into the UCVM, from having the capacity to affect any change outside of the UCVM.

In an embodiment, a UCVM is created by (a) cloning a copy of virtual machine having desired characteristics and (b) providing access to a restricted file system to the newly created UCVM. For example, UCVM 160 comprises restricted file system 160A, UCVM 162 comprises restricted file system 162A, and UCVM 164 comprises restricted file system 164A. Each UCVM possesses its own instance or copy of the operating system, which is isolated and separate from the main operating system (including its code and data) executing within VM0 130 or LVM 140. For example, UCVM 160 comprises operating system 160B, UCVM 162 comprises operating system 162B, and UCVM 164 comprises operating system 164B.

To provide a low latency user experience, UCVMs may not be booted from scratch each time an application is needed to be started. Instead, a UCVM may be created very quickly by cloning the UCVM from a template VM (with a booted OS) that has been pre-loaded in memory at system boot time. In an embodiment, the template used to clone a UCVM may be selected from templates 138 stored in VM0 130. A variety of techniques can be employed to make this cloning operation as fast as a few 100 milliseconds. Multiple types of templates may be used by a system to create UCVMs depending the nature and type of application(s) to be run inside the UCVM, as discussed in greater detail below in the section entitled "Cloning a UCVM from a Template."

Module 136 is software that is responsible for implementing the rules and policies of embodiments as well as helping the user of client 100 in understanding and navigating the security model employed by client 100 on an as-needed basis. Module 136 helps decide what activities run in which UCVMs, including when VMs are created or destroyed, and what kind of access to network and file system resources each UCVM has. Module 136 also helps protect the user, e.g., when a user is fooled by malware running in a UCVM and is in the process of providing some information that they have previously provided to enterprise code running in LVM 140 (for example a password), then module 136 may detect this situation and prevent the user from providing the information (which may be secret corporate information) to the malware.

Regarding the restricted file system of each UCVM, each UCVM has access to a private copy of a subset of the files in file system 142 on client 100. A UCVM may only have access to those files which the UCVM should need for the correct operation of the application executing therein. For example, user files are usually not required for correct operation of an application executing in a UCVM and thus are not typically exposed to a UCVM. On the other hand, if a UCVM is created as a result of the user wishing to edit a document using an application, such as MS Word, then a copy of the document the user wishes to edit will be provided to the restricted file system of the UCVM at the time the UCVM is created. Advantageously, using UCVM 160 as an example, if a process executing within UCVM 160 makes any changes to any files in restricted file system 160A, then these changes do not impact the files stored in file system 142 maintained in LVM 140 because such changes are only made to restricted file system 160A maintained in the UCVM and are not propagated, without express consent from the user, to file system 142 maintained by LVM 140.

In a typical use case of a UCVM, the UCVM may run a local application or an individual web page session. When a user is done running the local application or navigates away from a web page to another page with a different Internet URL domain, the corresponding UCVM is destroyed. Any new local application or web application will be run inside a brand new, separate UCVM that is cloned again from a clean UCVM master template. Thus, if there has been any compromise to the UCVM during the course of running some malicious code that was introduced into the UCVM, then the adverse effects of the security breach are isolated to only the affected UCVM and are lost when the UCVM is destroyed.

For example, assume that a user double-clicks on a MS Word document icon in Windows Explorer. Embodiments create a special UCVM to run the MS Word process. In a particular embodiment, module 136 of VM0 130 may dynamically create the UCVM using a template selected from one or more templates 138 or use a pre-existing template in memory or on the disk. The template selected by module 136 may be selected based on what activity is to occur within the UCVM, i.e., the selected may be designed to create a UCVM having characteristics that are optimal for running a text editor therein. The created UCVM contains a copy of the operating system as well as a restricted (local) copy of the file system. This local copy of the file system in the UCVM contains all the usual Windows and Program files; however, the user's profile folder in the local copy of the file system contains only the single target MS Word document being opened.

As another example, assume that three tabs are open in a web browser and further assume that each tab displays a different web page. In consideration of the code which may be contained or embedded on a web page, each web page may be properly considered a web application. In embodiments of the invention, the code responsible for rendering the user interface (UI) of the web browser runs in VM0 130. On the other hand, executable code for the three web applications runs in three separate UCVMs. A core HTML/JavaScript engine runs in each of the three UCVMs. Each of the three separate UCVMs also may have characteristics selected or optimized for web browsing. A copy of the file system within each of the three separate UCVMs does not contain any part of the user's files, as they are not required for the task performed by each UCVM, namely displaying a web page. Thus, each web application (or web page in this example) is completely isolated from the rest of the system.

In an embodiment, a UCVM may be connected to the Internet according to an access policy determined by the nature of the code running within the UCVM. To illustrate, web pages are typically restricted as per a strict "same origin policy" similar to the rules implemented by modern web browsers. In the "same origin policy," scripts running on web pages are permitted to access methods and properties of other scripts originating from the same site with no specific restrictions, but are prevented from accessing most methods and properties across web pages on different sites. Untrusted native applications running outside of the web browser are restricted by default to be able to connect only to the domain from which the program was downloaded (and to specific content delivery networks (CDNs) that may be in use by the domain in question).

This level of network access for downloaded applications can be explicitly changed (increased or decreased) by the end-user to include additional sites on the Internet. End-user control over what a UCVM can connect to may be subject to certain limitations related to corporate networks and sensitive web sites (such as a bank and web mail provider). For example, any code running in a UCVM may not, in general, access any site on a corporate Intranet to which client 100 is connected. Applications that need to connect to the corporate Intranet may need to be signed by the IT administrator of the domain. Similarly, non-web untrusted application code in a general UCVM may not connect to a web site associated with a search engine or bank or other sites that may have been previously identified as being "off limits." These connections can only be made through a web browser (which spawns UCVMs bound to these special domains) or from a special purpose LVM called a VVM, which described in further detail below.

In an embodiment, there is no communication channel available for an application running in one UCVM to communicate with an application running in another UCVM. Thus, applications running in UCVMs are completely isolated from each other and from the other applications in the system. This is well suited for running downloaded third party local applications which are generally designed to be self-contained or for Internet applications (web pages are not supposed to rely on any communication between applications within the web browser). In an alternate embodiment, communication between an identified set of virtual machines can be enabled by a person with sufficient privileges, such as an IT administrator for client 100.

Firewall Virtual Machine

In an embodiment, the implementation of the network access restrictions is done in a dedicated VM called a firewall VM. FIG. 1 depicts an exemplary firewall VM 150 of an embodiment. Firewall VM 150 runs an isolated operating system with a dedicated and fixed set of firewall applications that implement the network access policy for all VMs in client 100 (except perhaps VM0 130, which may not have any network access). Firewall VM 150 may provide, to any virtual machine running on client 100 in which untrusted code is executed or untrusted data is being interpreted, restricted access to only those network resources deemed necessary on an as-needed basis in accordance with a policy described by policy data stored on client 100.

In another embodiment of the invention, the firewall functionality of the system may be co-located and implemented inside either the hypervisor 120 of FIG. 1, or inside the LVM 140 of FIG. 1 (working in conjunction with the hypervisor 120 of FIG. 1), or inside VM0 130 of FIG. 1 (working in conjunction with the hypervisor 120 of FIG. 1).

Validated Virtual Machines—VVMS

UCVMs are not appropriate to run local applications that interact heavily with each other using local APIs such as COM, as typically there is no communication channel available for an application running in one UCVM to communicate with an application running in another UCVM. Embodiments may employ one (or more) special UCVMs called a Validated Virtual Machine (VVM) for the purpose of running relatively trusted local applications that have complex interactions between the applications. Such complex interactions are common in enterprise frameworks containing multiple applications, such as Microsoft's Office Suite and IBM's Lotus Notes.

FIG. 1 depicts an exemplary VVM 166 of an embodiment. Note that while FIG. 1 depicts a single VVM for ease of explanation, other embodiments of the invention may employ two or more VVMs or no VVMs based upon the particular needs of the user and/or policies of the organization responsible for or the owner of client 100.

Applications need to be signed and configured for co-location in the same VM by an administrator of client 100 before they can run in VVM 166. Inside VVM 166, signed applications can interact with each other using all types of APIs and frameworks supported by the OS being used. In an embodiment, the default network access policy of a VVM is to allow access to a corporate network only. The IT administrator may increase or decrease this level of access, subject to certain restrictions.

In an embodiment, specific signed applications or suites (groups of applications) that originate from a trusted source (other than the enterprise) may also be designated to run together in a particular VVM responsible for applications originating from that source. For example, all non-corporate applications that are signed by a specific vendor may be run together in a single VVM. These applications would then be isolated from corporate applications and general untrusted applications, but not from one another. A specific network access rule that is more permissive than the "same origin policy" used for web applications and unsigned applications may be used for a VVM. The restricted copy of file system 142 exposed to a VVM is similar to that exposed to a generic UCVM in that the restricted copy of file system 142 exposed to a VVM comprises only those files related to, or required for, performance of the applications executing within the VVM.

The Restricted File System Exposed to a VM

Figure 3:
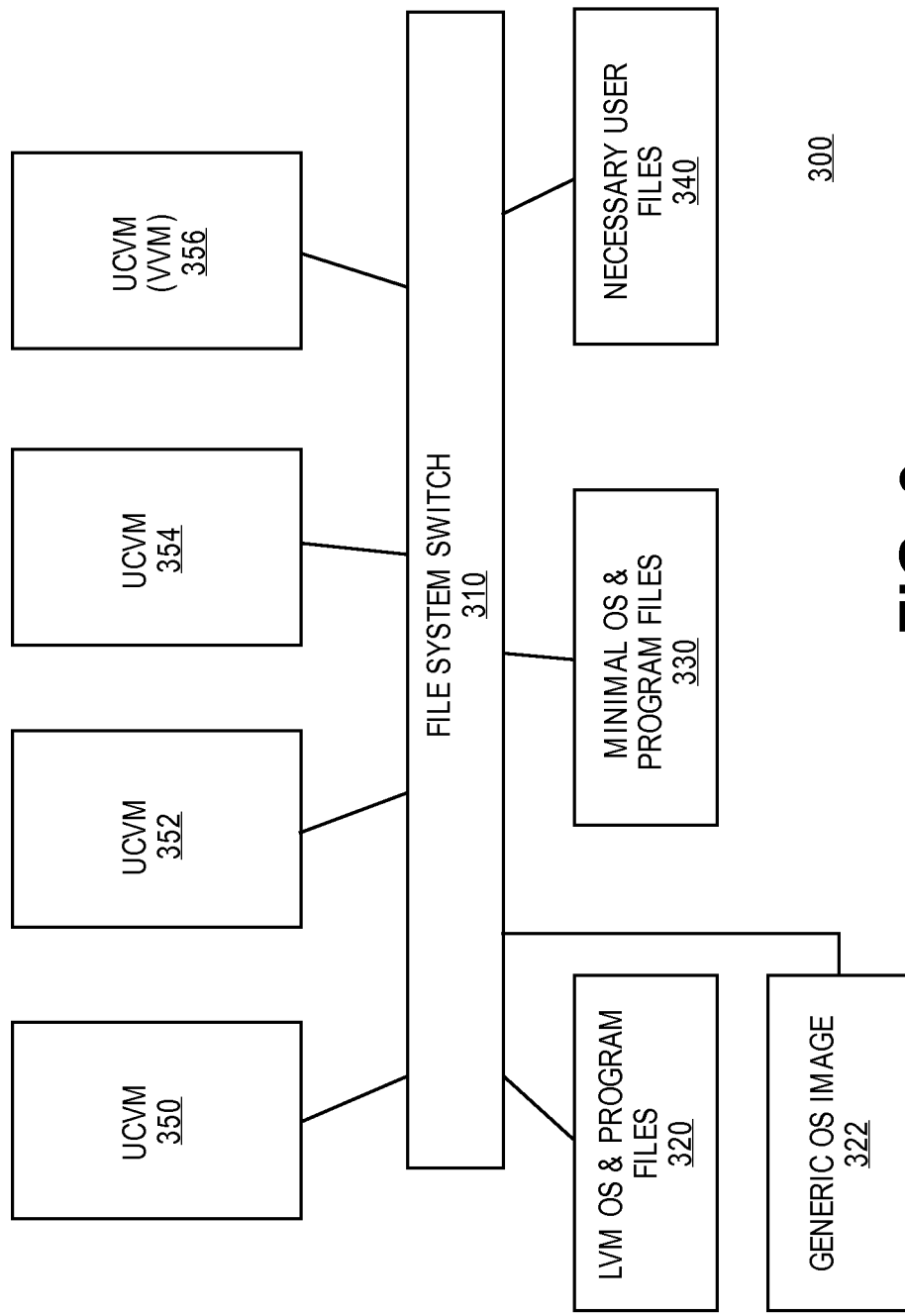
FIG. 3 is block diagram of the functional components involved in exposing a restricted copy of the file system to different UCVMs (and VVMs) according to an embodiment of the invention.

FIG. 3 is block diagram of the functional components involved in exposing a restricted copy of file system 142 to different UCVMs (and VVMs) according to an embodiment of the invention. File System Switch 310 is software that is configured to provide the newly created UCVM with access to a copy-on-write clone of the OS image that the UCVM was created from once the UCVM has started. The minimal operating system and program files 330 in the copy-on-write clone may be created from either the corporate LVM OS image 320 or a separate generic stripped down OS image 322 which may be created by the IT administrator.

Furthermore, a newly created UCVM is provided a copy of necessary user files 340, which are a subset of the user files in file system 142. The composition of necessary user files 340 will be different for each user. The set of files comprising the user files in file system 142 maintained in LVM 140 are typically those files in the user's home folder, e.g., c:\Users\<username>. The particular copies of files that are provided to a particular UCVM as necessary user files 340 are the minimum set of files that are needed by that UCVM to accomplish what the user intended to do as captured when the target application was being invoked. For example, if the user double clicked on a specific MS Word file named ABC.docx at the location c:\Users\<username>\Documents in the file system 140 maintained in LVM 140, then necessary user files 340 would only include a copy-on-write clone of the ABC.docx file and only this copy-on-write clone of the ABC.docx file is made available in the virtual c:\Users\<username>\Documents folder made visible to the newly created UCVM running the MS Word application. If a program (like MS Word) was started without any association with a file, then necessary user files 340 would correspond to an empty c:\Users\<username>\Documents virtual folder.

Any application running in a UCVM therefore only has access to the particular set of user files provided explicitly by the user when the program was invoked. Subsequently, if the user wants to browse file system 142 for another file from within the application (for example, by using the File→Open menu item of MS Word), then he or she will see a restricted user files directory.

Figure 4:
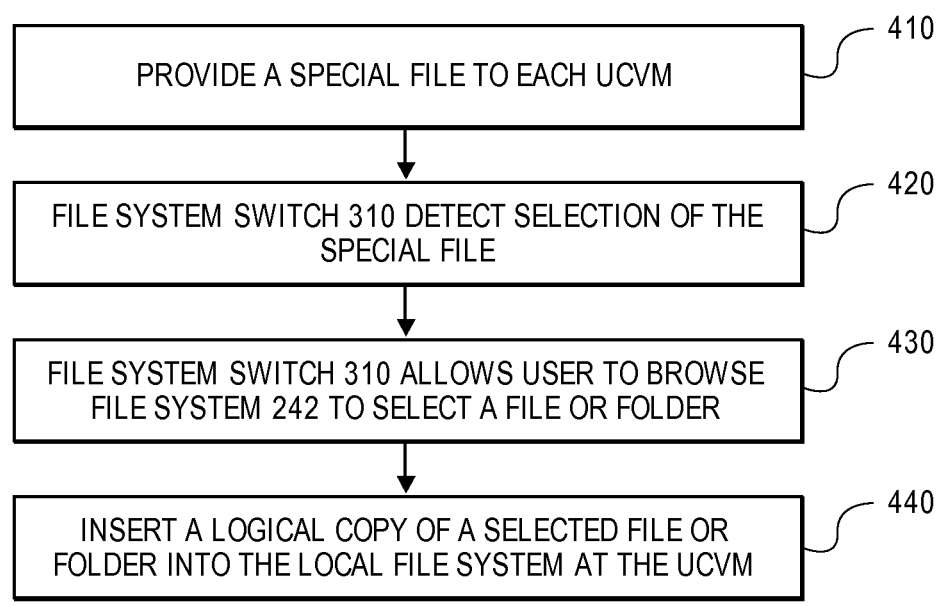
FIG. 4 is a flowchart illustrating the steps involved in a UCVM obtaining a copy of a new user file maintained in the file system stored elsewhere according to an embodiment of the invention.

To enable the user to select files from the user's own User Files folder in file system 142 maintained in LVM 140 using an application executing within an UCVM, a user interface may be provided to allow the user to browse his or her files in file system 142, select one or more of the user files, and expose a copy of the selected files to the appropriate UCVM. FIG. 4 is a flowchart illustrating the steps involved in a UCVM obtaining a copy of a new user file maintained in file system 142 according to an embodiment of the invention. In step 410, a special file is provided to each UCVM. The special file may be provided to the UCVM in a number of different ways, e.g., the special file may be inserted into each folder of the virtual C:\Users\<username> directory provided to each UCVM. This special file may be named something akin to "Show All My Files" or the like, as its selection will be used to trigger exposing additional copy-on-write clones of files stored in file system 142 to the UCVM.

In step 420, File System Switch 310 detects when the special file is selected by the user. For example, when a program executing within a UCVM browses to the special file, presumably as a result of a user click, this action may be trapped by File System Switch 310.

In step 430, File System Switch 310 invokes a dialog with LVM 140 that allows the user to browse the full file system 142 maintained in LVM 140. The user may then select a file or folder in file system 142. Note that at this stage, the user may be granted read access to the full file system 142 for purposes of selecting a file or folder, but the user is not granted write access to file system 142. Therefore, the user is prevented from modifying file system 142 maintained by LVM 140 in any way.

In step 440, after the user selects a file or folder, a copy of the selected file or folder is created. The copy of the selected file or folder is then inserted into the restricted file system associated with the UCVM. As a result of inserting the copy of the selected file or folder in the restricted file system associated with the UCVM, an application executing in the UCVM may have read and write access to the copy of the selected file or folder in the virtual file system, but is prevented from effecting any change to the original copy of the selected file or folder in file system 142 maintained by LVM 140.

The steps of FIG. 4 ensure that files in file system 142 maintained by LVM 140 are not visible to a UCVM without explicit permission from the user. Malicious code running in a UCVM, for example, cannot programmatically access files in file system 142 in LVM 140. Further, malicious code running in a UCVM also cannot render a false user interface to trick the user into unintentionally providing any user files to the malicious code, since all code responsible for rendering the user interface is maintained within VM0 130, and thus, unreachable by the malicious code.

File System Switch 310 may be implemented in a variety of ways. For example, in one embodiment, File System Switch 310 may be implemented by a network file system protocol (NFS or CIFS may be used). A special VM (or LVM 140) may be used as the OS serving the "User Files" shared file system. Other VMs "mount" this shared file system using NFS or CIFS (or another network file system) from the hosting VM. Application software in the hosting VM may decide what files are exposed to which VM based on instructions provided by VM0 130.

In another embodiment, File System Switch 310 may be implemented, in part, by a proprietary protocol for handling communications between the different UCVMs and File System Switch 310. File System Switch 310, in such an embodiment, may be implemented as part of a special VM or in LVM 140.

Cloning a UCVM from a Template

In an embodiment of the invention, a virtual machine created in client 120 is instantiated using a template selected from one or more templates 138 stored in VM0 130. In an embodiment, each template in one or more templates is either immutable or updatable in a very controlled fashion.

Each of one or more templates 138 may be used to instantiate or create a virtual machine with different characteristics or operational parameters. The characteristics or operational parameters described by a template may be configured, tailored, or suited for a particular context or type of processing activity. For example, each template may specify what type of code is to be run within a virtual machine created using the template, a size of the virtual machine created using the template, firewall settings for the virtual machine created using the template, what type of virtual machine (for example, a VVM, UCVM, or a LVM) is the be created using the template, how changes to a local file system within the virtual machine created using the template are to be persisted, and what portion, if any, of the network can a virtual machine created using the template access.

One or more devices internal to client 100 or externally connected to client 100 may interact with one or more processes executing in a virtual machine within client 100. In an embodiment, a template may assign responsibility for a selected set of devices to a virtual machine created using the template. In other embodiments, responsibility for a selected set of devices may be assigned to a particular virtual machine by virtue of policy data stored on client 100. Such policy data may describe one or more policies provided to client 100 from an owner or responsible organization of client 100. Policy data of this nature may be maintained by VM0 130 or LVM 140, for example, in certain embodiments.

In an embodiment, one or more templates 138 may be arranged in a hierarchy such that there is a root node corresponding to a template having a default set of characteristics. The root node may have one or more child nodes, and each of these child nodes may be associated with a template that inherits the properties of the parent template, but contains additional or changes properties associated with that child node. Naturally, each child node may also have children, and so the hierarchy of templates may be an arbitrary number of levels deep, where each template inheriting characteristics of its parent, but yet each template is capable of further defining or changing characteristics that distinguishes the template over its parent.

Branches of the hierarchy of templates may be associated with, or more particularly suited for, different types of activity. For example, certain templates may be associated with corporate activity, and may therefore specify characteristics related to virtual machines running corporate applications. Similarly, certain templates may be associated with the user's personal application's activity or Internet/Web related activity, and may therefore specify characteristics related to virtual machines running the user's own applications or Internet/Web applications respectively.

Platform Virtualization

Platform virtualization is performed on a given hardware platform by host software (a control program), which creates a simulated computer environment, termed "a virtual machine," for its guest software. A hypervisor, also called virtual machine manager (VMM), is one of many hardware virtualization techniques that allow multiple operating systems, termed "guests," to run concurrently on a host computer. The hypervisor presents to the guest operating systems a virtual operating platform and manages the execution of the guest operating systems. A guest OS executes as if it was running directly on the physical hardware. Access to physical system resources such as the network access, display, keyboard, and disk storage is suitably virtualized so that a guest OS does not know that these are virtual devices.

Generally, there are two types of hypervisors. Type 1 (or native, bare metal) hypervisors run directly on the host's hardware to control the hardware and to manage guest operating systems. A guest operating system thus runs on another level above the hypervisor. Type 2 (or hosted) hypervisors run within a conventional operating system environment. With the hypervisor layer as a distinct second software level, guest operating systems run at the third level above the hardware. In other words, Type 1 hypervisor runs directly on the hardware; a Type 2 hypervisor runs on another operating system, such as Windows. Embodiments of the invention may use any type of hypervisor. Thus, hypervisor 120 in FIG. 1 may either be a Type 1 or a Type 2 hypervisor.

A virtual disk image (or simply "a virtual disk") is a file on a physical disk, which has a well-defined (published or proprietary) format and is interpreted by a hypervisor as a hard disk. A virtual disk image may have a specific file type extension, e.g., .vmdk for VMware VMDK, .vhd for Xen and Microsoft Hyper-V, and .vdi for Oracle VM VirtualBox.

There are two approaches employed for storage allocation by prior hypervisors, namely, (1) pre-allocate the entire storage for the virtual disk upon creation and (2) dynamically grow the storage on demand. In the former approach involving pre-allocation, the virtual disk may be implemented as either split over a collection of flat files (typically one is at least 2 GB in size) or as a single, large monolithic flat file. In the latter approach involving on-demand growth, the virtual disk may also be implemented using split or monolithic files, except that storage is allocated on demand.

There are two modes in which a disk can be mapped for use by a virtual machine. In a virtual mode, the mapped disk is presented as if it is a logical volume, or a virtual disk file, to the guest operating system and its real hardware characteristics are hidden. In a physical mode, also called the pass through mode, the hypervisor bypasses the I/O virtualization layer and passes all I/O commands directly to the disk.

A virtual machine (VM) is a software implementation of a machine (i.e. a computer) that executes programs like a physical machine. Virtual machines allow the sharing of the underlying physical machine resources between different virtual machines, each running its own operating system. The software layer providing the virtualization is called a hypervisor, such as hypervisor 120 in FIG. 1.

Virtual machines each require their own image of the operating system. The guest OS and host OS typically do not share the OS image, even if they are the same OS. This is problematic for several reasons. First, if a user wishes to run 10 different virtual machines, then she will require 10 different copies of the OS for the guest OSs, which requires an undesirable amount of storage to maintain. Second, the OS for a VM has to be created either by installing a new OS or shipping a copy of the OS from somewhere else, which is burdensome for those who do not have access to OS images. It is also time consuming to install a new OS or ship an OS image, which is typically quite large. A third problem is that any software present in the host OS (such as a printer driver) will not be available in a guest OS unless it is installed again.

Policy Considerations for Determining Whether a Network should be Trusted

Figure 5:
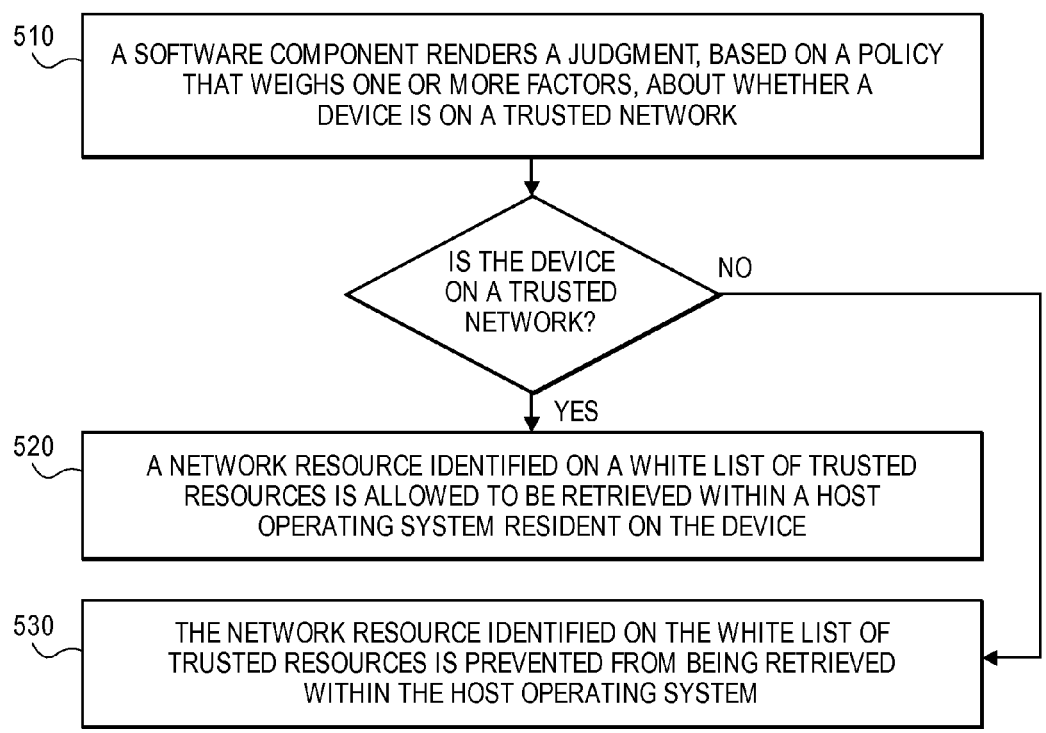
FIG. 5 is a flowchart illustrating the functional steps of processing network access requests based according to an embodiment of the invention.

FIG. 5 is a flowchart illustrating the steps of processing requests for network resources according to an embodiment of the invention. The steps of FIG. 5 may be performed in response to a device, such as client 100 of FIG. 1, requesting a resource from a remote location over a network. While a requested resource may correspond to any type of file or digital content, many examples herein will be discussed with reference to the requested resource being a web page. For example, if a user issues a request for a web page using a web browser executing on a computer, then the steps of FIG. 5 may be used to determine how the web page request should be processed by the computer to eliminate the risk that the computer may become infected with malicious code carried by the requested network resource.

By performing the steps of FIG. 5, one may determine how a request to retrieve a network resource should be processed to reduce or eliminate the risk of accidental exposure to malicious code. Embodiments of the invention may process requests for network resources which are deemed to pose little to no risk to the device from within a first location, such as a host operating system, whereas requests for network resources which are deemed to pose some risk to the device may be performed from within a different location, such as virtual machine designed to isolate the processing of the request (including the network resource itself) from the remainder of the device. This is done to ensure that any malicious code carried by a retrieved suspect resource cannot infect any portion of the device outside of the environment from which the suspect resource is retrieved.

In step 510, a software component running on a device renders a judgment, based on a policy (hereafter termed the "the trusted network policy") that weighs one or more factors, about whether the device is on a trusted network. If the device is not on a trusted network, then there is a risk that parties on that network, including the DNS on that network, may either be compromised by malicious code or operated by a malicious party. If the DNS of a network is compromised by malicious code or operated by a malicious party, then the DNS may be used to redirect network requests to different locations for nefarious purposes, e.g., the network request may be redirected to a source of malicious code for purposes of infecting the computer which issued the network request.

An attacker in control of a router may hijack a TCP connection and return malicious code in place of the resource that was requested. While any router could potentially be compromised, routers which are more local to a client requesting a network resource have a greater opportunity to interfere with a request from the client. Therefore, assessing the trustworthiness of the network the client is directly connected to, and acting accordingly, provides great impact upon the protecting the integrity of the client.

In an embodiment, the network resource being requested may reside on a white list of trusted resources. For example, the user may issue, using a web browser executing on client 100, a request for a web site which has previously been identified on a list of resources (termed a "white list" of resources) deemed permissible to be viewed, executed, and/or rendered on the device. White lists of this nature may be arbitrarily complex, as permissible actions may vary in scope and may be based on one or more factors having different weights.

Despite the requested resource being previously deemed safe for certain activity by its inclusion on the white list, there remains the possibility that the DNS involved in resolving the request for the network resource may do so in a malicious way. Advantageously, the steps of FIG. 5 are designed to address and overcome this risk.

As used herein, the term "DNS server" or simply "DNS" refers to any component, located external to client 100, involved in resolving a URL and the like to identify a network resource to the location at which the resource resides. Thus, the term DNS, is used broad enough herein to refer to software components referred to as resolvers as well as those software components referred to as domain name servers.

In an embodiment, the software component of step 510 may be embodied by module 136 of FIG. 1, the device may correspond to client 100, and the trusted network policy may be stored within policy data 139 also depicted in FIG. 1. For purposes of providing a concrete example, module 136 and policy data 139 may be referred to below in the description of FIG. 5; however, those in the art shall appreciate that other software components running on client 100 may perform the steps of FIG. 5 and that the trusted network policy may be stored in other locations on client 100 other than within policy data 139.

There are many factors which may be considered by the trusted network policy in determining whether a particular device is on a trusted network. The trusted network policy, in determining whether the device is on a trusted network, may consider one factor or multiple factors and may assign each factor its own weight.

The trusted network policy may interpret the occurrence of a number of different events as evidence that client 100 is on a trusted network. For example, if client 100 is required to make a mutually authenticated connection with the network, then the trusted network policy may deem the network secure, and therefore, may trust the DNS and the integrity of the network devices local to that network. According to another embodiment, the trusted network policy may conclude that client 100 may be on a trusted network if client 100 can connect and verify the identity of a particular network resource that is known only to be accessible over a trusted network.

Other non-limiting, illustrative examples of events which may cause the trusted network policy to conclude that client 100 is on a trusted network include (a) making a mutually authenticated connection to an Active Directory (AD) domain controller registered with client 100, (b) client 100 successfully performs a required IEEE 802.1X authentication to gain access to the network, (c) client 100 successfully performs a required WPA2 authentication to gain access to the network, (d) client 100 successfully authenticates to a virtual private network (VPN) tunnel, and (e) the DNS has an IP address is listed in a set of trusted net blocks.

As illustrated in the above examples, the trusted network policy may determine that it is reasonable to trust a network because the device is required to authenticate itself to client 100 when client 100 joins the network, and the network is on a list of known trusted networks. Additionally, the trusted network policy may conclude that it is reasonable to trust a network if the network is acting in a trustworthy manner by only servicing parties who could successfully authenticate themselves to the network. Thus, in certain implementations, if a network requires mutual authentication to join the network (i.e., the device may authenticate the network and vice-versa), then the network may be deemed trustworthy.

Having described illustrative approaches for determining if a network should be deemed trustworthy, additional details about how the trusted network policy may be used by embodiments is now provided.

Processing a Network Request Based Upon Policy Considerations

If, in step 510, module 136 judged that the client 100 is on a trusted network, then, in step 520, the requested network resource, which is on a white list of trusted resources, is allowed to be retrieved within a host operating system resident on the device or from within a guest operating system resident on client 100 serving as a root of trust on client 100.

If, in step 520, module 136 judged that client 100 is not on a trusted network, then, in step 530, the requested network resource is prevented from being retrieved within the host operating system or the operating system serving as the root of trust on client 100 despite being identified on a white list of trusted resources. Instead, upon module 136 determining that client 100 is not on a trusted network, a variety of different actions may be performed to protect the integrity of client 100.

In an embodiment, if module 136 determines that client 100 is not on a trusted network, then in an embodiment, module 136 ceases to enforce a security constraint the prevents virtual machines from establishing a connection to an IP address within a net block assigned to an Intranet. To explain why this is helpful, it should be appreciated that certain security policies may prevent virtual machines executing on client 100 from establishing connections to sensitive resources, such as those network resources available on an Intranet, to avoid the prevent any malicious code inadvertently introduced into the virtual machine from accessing such resources. Thus, client 100 may enforce a security policy that certain net blocks corresponding to IP addresses on a trusted Intranet may not be accessed from virtual machines executing on client 100. However, net block addresses which are used by one entity to reference addresses on an Intranet may, in certain circumstances, be assigned by other entities to addresses on the Internet. If client 100 is not connected to a trusted network (such as the Intranet), then there is a possibility that a user of client 100 may wish to use client 100 to access, over an untrusted network (such as the Internet), a network resource which has coincidentally been assigned to an IP address within a net block assigned to an Intranet associated with an operator of client 100. If client 100 enforced the security constraint prohibiting virtual machines from establishing a connection to an IP address within a net block assigned to the Intranet, then client 100 could not access this network resource from a virtual machine, thereby either preventing client 100 from accessing the network resource or potentially forcing client 100 to retrieve the network resource from a host operating system (which would render the host operating system vulnerable to any malicious contained within the network resource). As a result, certain embodiments, upon module 136 determining that client 100 is not on a trusted network, then module 136 ceases to enforce a security constraint the prevents virtual machines in client 100 from establishing a connection to an IP address within a net block assigned to an Intranet, thereby allowing client 100 to retrieve network resources over an untrusted network from within a virtual machine running on client 100.

As another example of an action that might be performed in step 530 if client 100 is determined to not reside on a trusted network, the user of client 100 may be informed that the integrity of the network resource being requested cannot be verified. This notification may take many forms, e.g., a dialogue box may be displayed with a warning which the user is obligated to acknowledge (for example, by clicking a button) to continue. This notification allows the user to retrieve the network resource by knowingly assuming the risk of doing so.

As another example of an action that might be performed in step 530 if client 100 is determined to not reside on a trusted network, in addition to or in lieu of informing the user that the resource might be comprised, the user may be prompted for permission to retrieve the resource despite the resource being potentially compromised. If the user expressly grants permission to retrieve the resource, then the resource may be retrieved with a virtual machine.

As another example of an action that might be performed in step 530 if client 100 is determined to not reside on a trusted network, in addition to or in lieu of any of the above illustrative actions performed in step 530, client 100 may be prevented from retrieving the requested resource. In such an embodiment, the resource may not be retrievable by client 100 at all. Such an embodiment may be particularly useful in high risk contexts or if there is a high likelihood that the network is untrustworthy or contains malicious parties.

As another example of an action that might be performed in step 530 if client 100 is determined to not reside on a trusted network, in addition to or in lieu of any of the above illustrative actions performed in step 530, client 100 may be allowed to retrieve the resource within a virtual machine. Such a virtual machine may be instantiated for the purpose of retrieving the network resource and performing operations thereon. Once the network resource is no longer required, the virtual machine storing the network resource may be closed.

As another example of an action that might be performed in step 530 if client 100 is determined to not reside on a trusted network, in addition to or in lieu of any of the above illustrative actions performed in step 530, module 136 may only allow client 100 to access the requested network resource if the identity of the requested resource can be successfully validated using a HTTPS certificate. A related factor which may also be considered by the trusted network policy concerns the identity of the issuing authority of the certificate of validation. A web browser, upon installation, may be configured to trust a plurality of authorities that issue certificates of validation. A web browser may use a certificate of validation in establishing a secure communicate channel, such as using Hypertext Transfer Protocol Secure (HTTPS). Other applications besides web browsers may also be configured to recognize various types of certificates of validation associated with resources to authenticate the resource or in supporting a feature which requires further authentication.

Certain authorities may be more trustworthy than others. Some of the authorities which issue certificates of validation may be in the control of nation states or other organizations which might allow, either knowingly or unknowingly, a certificate of validation to be compromised. In certain embodiments, the trusted network policy may consider the trustworthiness of an authority issuing a certificate of validation associated with a requested network resource when determining how the request to retrieve that resource should be processed. To illustrate, in an embodiment, when a resource, which is associated with a certificate of validation issued by a suspect authority, is requested over a network, then in an embodiment the trusted network policy may ignore a certificate of validation successfully validated by the suspect authority, since the suspect authority itself might be corrupt or corrupted by malicious code.

Alternately or additionally, an unexpected certificate of validation might be a factor considered by the trusted network policy which leans towards concluding that the DNS accessible to the device is not on a trusted network. For example, if a certain web site is known to have certificates of validation issued by one or more trustworthy authorities, and if a web page from the web site retrieved over a network is accompanied by a certificate of validation issued by an authority previously not known to do so, then this may be interpreted by the Trusted network policy as evidence that the DNS is not on an untrusted network. The rationale for this is that it is deemed more likely that the resource associated with an unexpected certificate of validation is masquerading as an authentic and secure copy of the resource rather than the web site or provider of the network resource actually establishing a relationship with a new issuing authority of a certificate of validation.

Retrieving Resources from Other Locations than a Host Operating System

In an embodiment, in situations where client 100 is determined to be on a trusted network, rather than retrieving the network resource from within a host operating system environment, the network resource may instead be retrieved from with a virtual machine. Such a virtual machine may have characteristics particular tailored for retrieving network resources from a trusted network. For example, a virtual machine (termed a "less restrictive virtual machine") instantiated for use with a trusted network may have access to a larger amount of resources than a virtual machine (termed a "more restrictive virtual machine") instantiated for use with an untrusted network. A more restrictive virtual machine may be instantiated with a more restrictive set of access privileges than a less restrictive virtual machine.

Either a less restrictive virtual machine or a more restrictive virtual machine may be deallocated when no longer required, e.g., the retrieved resource is no longer being opened, viewed, or otherwise used and/or it is likely the virtual machine will not be needed for some time.

Using Characteristics of the Network as a Basis for Trust

In an embodiment, only resources obtained over a trustworthy network are retrieved in a less restrictive virtual machine. To illustrate a concrete example, assume that client 100 accessing an unauthenticated network (such as a public Wi-Fi network) and an authenticated network (such as a virtual private network). The authenticated network requires mutual authentication to join the network. Client 100 may be prevented, using a policy stored in policy data 139, from sending any packets through the public network if the destination of the packets is within the virtual private network.

Client 100 may be prevented from opening any resource (including those resources on a white list of trusted resources) within the host operating system executing on client 100 or within a less restrictive virtual machine (which may be, for example, UCVM 160) executing on client 100 unless the resource is retrieved over the authenticated network rather than the unauthenticated network. On the other hand, upon determining that the resource was retrieved over the unauthenticated network rather than the authenticated network, client 100 retrieves the resource within a more restrictive virtual machine (which may be, for example, UCVM 162) executing on client 100. Note that the more restrictive virtual machine (UCVM 162) has a more restrictive set of access privileges than the less restrictive virtual machine (UCVM 160).

Hardware Mechanisms

Figure 6:
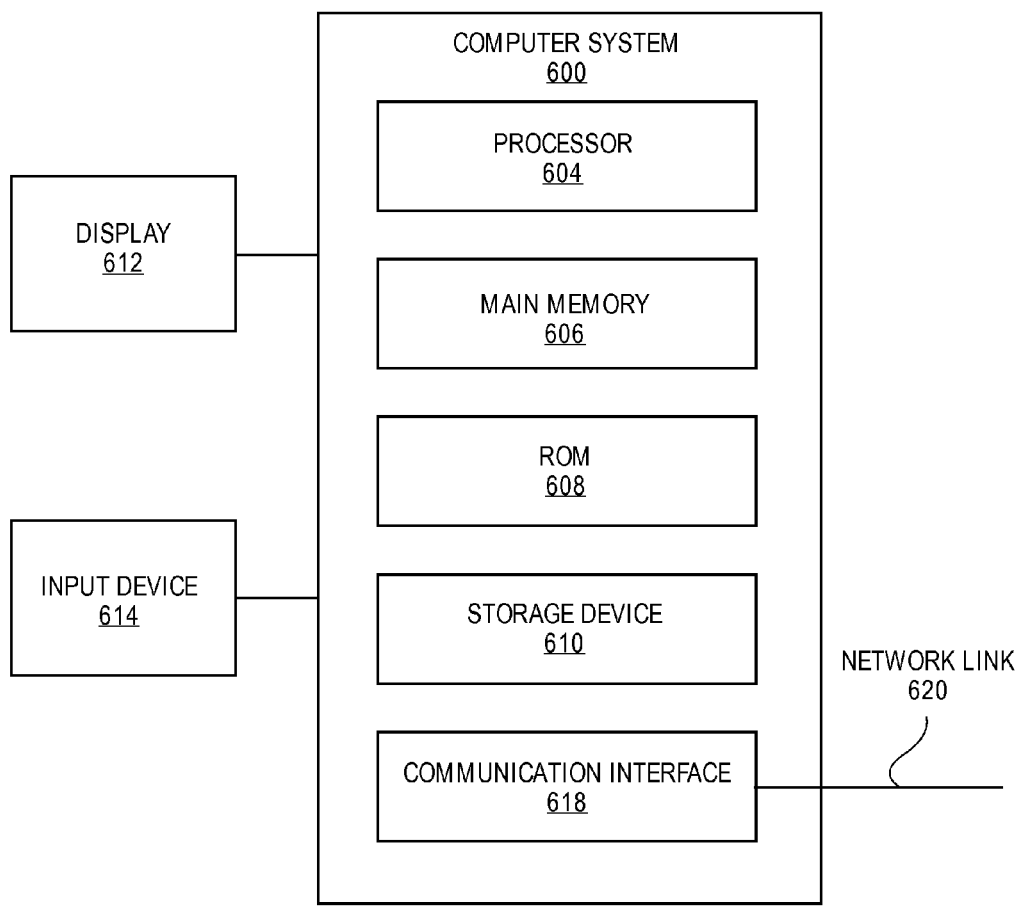
FIG. 6 is a block diagram that illustrates a computer system upon which an embodiment of the invention may be implemented.

In an embodiment, client 100 of FIG. 1 may be implemented on a computer system. FIG. 6 is a block diagram that illustrates a computer system 600 upon which an embodiment of the invention may be implemented. In an embodiment, computer system 600 includes processor 604, main memory 606, ROM 608, storage device 610, and communication interface 618. Computer system 600 includes at least one processor 604 for processing information. Computer system 600 also includes a main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device for storing static information and instructions for processor 604. A storage device 610, such as a magnetic disk or optical disk, is provided for storing information and instructions.

Computer system 600 may be coupled to a display 612, such as a cathode ray tube (CRT), a LCD monitor, and a television set, for displaying information to a user. An input device 614, including alphanumeric and other keys, is coupled to computer system 600 for communicating information and command selections to processor 604. Other non-limiting, illustrative examples of input device 614 include a mouse, a trackball, or cursor direction keys for communicating direction information and command selections to processor 604 and for controlling cursor movement on display 612. While only one input device 614 is depicted in FIG. 6, embodiments of the invention may include any number of input devices 614 coupled to computer system 600.

Embodiments of the invention are related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 604 for execution. For example, the instructions may initially be carried on a magnetic disk of a remote computer. The remote computer can load the instructions into its dynamic memory and send the instructions over a network link 620 to computer system 600.

Communication interface 618 provides a two-way data communication coupling to a network link 620 that is connected to a local network. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through a local network to a host computer or to data equipment operated by an Internet Service Provider (ISP).

Computer system 600 can send messages and receive data, including program code, through the network(s), network link 620 and communication interface 618. For example, a server might transmit a requested code for an application program through the Internet, a local ISP, a local network, subsequently to communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for dynamically determining how a device should process network access requests, which when executed by one or more processors, cause:
   enforcing a security constraint imposed upon virtual machines executing on the device that prevents said virtual machines from establishing a connection to an Internet Protocol (IP) address within a net block assigned to an Intranet,
   a software component rendering a judgment, based on a policy that weighs one or more factors, about whether the device is on a trusted network, wherein the policy interprets the device making a mutually authenticated connection with a network as support for deciding that the device is on a trusted network, and wherein the judgement is rendered against a network not previously identified as being trustworthy;
   upon rendering a judgment that the device is on the trusted network, allowing a network resource identified on a white list of trusted resources to be retrieved within a host operating system resident on the device; and
   upon rendering a judgment that the device is not on a trusted network, performing:
      preventing the network resource identified on the white list of trusted resources to be retrieved within the host operating system, and
      ceasing to enforce said security constraint imposed upon said virtual machines to allow said virtual machines to establish connections to said net block only while said device is not on a trusted network.

2. The non-transitory computer-readable storage medium of claim 1, wherein execution of the one or more sequences of instructions further causes:
   upon rendering a judgment that the device is not on a trusted network in response to attempting to access the network resource identified on the white list, performing one or more of: (a) informing a user of the device that the integrity of a requested resource cannot be verified, (b) asking the user for permission to retrieve the requested resource despite the resource being potentially compromised, (c) preventing the device from retrieving the requested resource, (d) allowing the device to retrieve the resource within a virtual machine, (e) only allow the requested resource to be accessed if the identity of the requested resource can be validated using a Hypertext Transfer Protocol Secure (HTTPS) certificate, and (f) only allow the requested resource to be accessed if the access is performed using https and the identity of the requested resource can be validated.

3. The non-transitory computer-readable storage medium of claim 1, wherein the one or more factors include whether the device can connect and verify the identity of a particular network resource that is known only to be accessible over the trusted network.

4. The non-transitory computer-readable storage medium of claim 3, wherein the identity of the particular network resource is verified using a Secure Socket Layer (SSL) certificate.

5. The non-transitory computer-readable storage medium of claim 1, wherein the policy interprets the device making a mutually authenticated connection to an Active Directory (AD) domain controller registered with the device as support for deciding that the device being on a trusted network.

6. The non-transitory computer-readable storage medium of claim 1, wherein the policy interprets the device communicating with a Domain Name Server (DNS) or an Internet Protocol (IP) Gateway over a trusted network as support for deciding that the device being on a trusted network.

7. The non-transitory computer-readable storage medium of claim 1, wherein the policy interprets a domain name server (DNS) having a network address associated with a virtual private network (VPN) as support for deciding that the device being on a trusted network.

8. The non-transitory computer-readable storage medium of claim 1, wherein the policy interprets the Internet Protocol (IP) address of a domain name server (DNS) being in a set of trusted net blocks as support for the device being on a trusted network.

9. The non-transitory computer-readable storage medium of claim 1, wherein the policy interprets the device successfully performing a required Institute of Electrical and Electronic Engineers (IEEE) 802.1X authentication to gain access to a network associated with a domain name server (DNS) as support for the device on a trusted network.

10. The non-transitory computer-readable storage medium of claim 1,
    wherein the policy interprets the device successfully performing a required Wi-Fi Protocol Access 2 (WPA2) authentication to gain access to a network associated with a domain name server (DNS) as support for the device being on a trusted network.

11. An apparatus for dynamically determining how a device should process network access requests, comprising:
   one or more processors; and
   one or more non-transitory computer-readable storage mediums storing one or more sequences of instructions, which when executed by the one or more processors, cause:
      enforcing a security constraint imposed upon virtual machines executing on the device that prevents said virtual machines from establishing a connection to an Internet Protocol (IP) address within a net block assigned to an Intranet;
      a software component rendering a judgment, based on a policy that weighs one or more factors, about whether the device is on a trusted network, wherein the policy interprets the device making a mutually authenticated connection with a network as support for deciding that the device is on a trusted network, and wherein the judgement is rendered against a network not previously identified as being trustworthy;
      upon rendering a judgment that the device is on the trusted network, allowing a network resource identified on a white list of trusted resources to be retrieved within a host operating system resident on the device; and
      upon rendering a judgment that the device is not on a trusted network, performing:
         preventing the network resource identified on the white list of trusted resources to be retrieved within the host operating system, and
         ceasing to enforce said security constraint imposed upon said virtual machines to allow said virtual machines to establish connections to said net block only while said device is not on a trusted network.

12. A method for dynamically determining how a device should process network access requests, which when executed by one or more processors, comprising:
- enforcing a security constraint imposed upon virtual machines executing on the device that prevents said virtual machines from establishing a connection to an Internet Protocol (IP) address within a net block assigned to an Intranet;
- a software component rendering a judgment, based on a policy that weighs one or more factors, about whether the device is on a trusted network, wherein the policy interprets the device making a mutually authenticated connection with a network as support for deciding that the device is on a trusted network, and wherein the judgement is rendered against a network not previously identified as being trustworthy;
- upon rendering a judgment that the device is on the trusted network, allowing a network resource identified on a white list of trusted resources to be retrieved within a host operating system resident on the device; and
- upon rendering a judgment that the device is not on a trusted network, performing:
    - preventing the network resource identified on the white list of trusted resources to be retrieved within the host operating system, and
    - ceasing to enforce said security constraint imposed upon said virtual machines to allow said virtual machines to establish connections to said net block only while said device is not on a trusted network.

* * * * *